United States Patent [19]

Basini et al.

[11] Patent Number: 5,336,655
[45] Date of Patent: Aug. 9, 1994

[54] CATALYTIC SYSTEM AND PROCESS FOR PRODUCING SYNTHESIS GAS BY REFORMING LIGHT HYDROCARBONS WITH $CO_2$

[75] Inventors: Luca Basini; Mario Marchionna; Stephano Rossini, all of Milan; Domenico Sanfilippo, Paullo, all of Italy

[73] Assignee: Snamprogetti S.p.A., Milan, Italy

[21] Appl. No.: 892,480

[22] Filed: Jun. 2, 1992

Related U.S. Application Data

[63] Continuation of Ser. No. 641,510, Jan. 15, 1991, abandoned.

[30] Foreign Application Priority Data

Jan. 26, 1990 [IT]  Italy .................. 19162 A/90

[51] Int. Cl.⁵ .................. B01J 21/00; B01J 23/1; B01J 23/40
[52] U.S. Cl. .................. 502/252; 502/251; 502/261; 502/263
[58] Field of Search ............... 502/251, 261, 263, 252

[56] References Cited

U.S. PATENT DOCUMENTS

| | | | |
|---|---|---|---|
| 3,695,856 | 10/1972 | Paul et al. | 502/252 |
| 4,101,450 | 7/1978 | Hwang et al. | 502/261 |
| 4,714,692 | 12/1987 | Abrevaya et al. | 502/261 |

FOREIGN PATENT DOCUMENTS

| | | | |
|---|---|---|---|
| 44802 | 4/1977 | Japan | 502/261 |
| 112840 | 6/1984 | Japan | 502/261 |

*Primary Examiner*—Carl F. Dees
*Attorney, Agent, or Firm*—Oblon, Spivak, McClelland, Maier & Neustadt

[57] ABSTRACT

A catalytic system for the production of synthesis gas by reacting light hydrocarbons, preferably methane, with $CO_2$ is described formed from:
  one or more compounds of metals of the platinum group, preferably chosen from rhodium, ruthenium and iridium;
  a support consisting of inorganic compounds chosen from oxides and/or spinels of aluminium, magnesium, zirconium, silicon, cerium and/or lanthanum, possibly in the presence of alkali metals, in which the weight percentage of the metal or metals of the platinum group in the catalytic system is between 0.01 and 20%, and preferably between 0.1 and 5%.

12 Claims, 3 Drawing Sheets

CATALYTIC SYSTEM AND PROCESS FOR PRODUCING SYNTHESIS GAS BY REFORMING LIGHT HYDROCARBONS WITH CO₂

This application is a Continuation of application Ser. No. 07/641,510, filed on Jan. 15, 1991, now abandoned.

This invention relates to a catalytic system and its use in a reforming process for the single-stage production of a gaseous mixture of $H_2$ and $CO$.

The main reactants used are $CO_2$ and light hydrocarbons, preferably methane. The chemical equation describing the process of the present invention is:

$$CO_2 + CH_4 \rightleftharpoons 2CO + 2H_2 \quad (1)$$

Hydrocarbon reforming reactions using $CO_2$ have certain considerable advantages compared with the widespread steam reforming processes described by the chemical equation:

$$H_2O + CH_4 \rightleftharpoons CO + 3H_2 \quad (2)$$

Processes mainly using reaction (1) represent the best method for producing mixtures of $H_2$ and $CO$ if the natural gas used as the feedstock contains large $CO_2$ quantities.

In addition an $H_2/CO$ mixture in a ratio close to 1, as can be easily obtained by this invention, can be used advantageously in alcohol synthesis and in oxosynthesis. Currently, using syngas produced by the steam reforming reaction (2), the obtained $H_2/CO$ mixture has a ratio $\geq 3$. To obtain smaller ratios a second stage has to be used employing the reaction:

$$CO_2 + H_2 \rightleftharpoons CO + H_2O \quad (3)$$

Adjusting the $CO/H_2$ ratio by this chemical reaction negatively affects the overall economy of the process.

A potential use of a reforming process using $CO_2$ as the main reactant instead of steam is in Fischer-Tropsch synthesis plants in which the $CO_2$ and methane produced could be again recycled to syngas of low $H_2/CO$ ratio.

The reforming process described by reaction (1), which produces $H_2/CO$ mixtures in an approximately equimolecolar ratio in a single stage, can also be advantageously used in highly integrated plants for ferrous mineral reduction. Finally, methane reforming processes employing $CO_2$ can be advantageously used, compared with steam reforming reactions, in thermal cycles for energy storage and transport by thermochemical pipe (TCP) [see T. A. Chubb, Solar Energy, 24, (1980) 341].

However, in contrast to steam reforming, systems involving $H_2$ and $CO$ synthesis from $CO_2$ and from light hydrocarbons do not have a well defined technology behind them. The Ni-based catalysts usually used in steam reforming processes are not sufficiently selective, and deactivate rapidly when the $H_2O/C$ ratio is less than 2 [see R. E. Reitmeier, K. Atwood, H. A. Bennet Jr. and H. M. Baugh, Ind. Eng. Chem. 40 (4), 620 (1948)]. This deactivation is due to the formation of carbon, which covers the active metal centres during catalysis and accumulates in the catalyst pores, possibly causing fragmentation. A catalytic system has now been found which produces synthesis gas ($H_2$ and $CO$) by a light hydrocarbon reforming reaction without undergoing any discernible deactivation due to coke formation by the reactions:

$$2CO \rightarrow CO_2 + C$$

$$CH_4 \rightarrow 2H_2 + C$$

even if the $H_2O/C$ ratio is distinctly favourable to such formation. The catalytic system according to the present invention is characterised by being formed from:

one or more compounds of metals of the platinum group, preferably chosen from rhodium, ruthenium and iridium;

a support consisting of inorganic compounds chosen from oxides and/or spinels of aluminium, magnesium, zirconium, silicon, cerium and/or lanthanum, either alone or in mutual combination and possibly in the presence of alkaline metals, in which the weight percentage of the metal or metals of the platinum group in the catalytic system is between 0.01 and 20%, and preferably between 0.1 and 5%.

The supports used can also consist of silicated aluminium, magnesium, cerium or lanthanum oxides. The surface area of the catalysts used preferably varies between 1 and 400 m²/g and more preferably between 10 and 200 m²/g, while the pore volume preferably varies between 0.1 and 3 cc/g and more preferably between 0.5 and 2 cc/g. The catalytic system can be obtained either by impregnating the inorganic compounds with a solution of a salt of the metals of the platinum group followed by thermal drying and calcining, or by dispersing the inorganic compounds in an organic solvent, then reacting this in a carbon monoxide or inert atmosphere with solutions of compounds of the metals of the platinum group. In this second case, the generally exothermic reaction, which results in coloured reaction products, is followed by filtration, drying and calcining.

This catalytic process is characterised by conducting the reforming preferably in a single stage using the aforedescribed catalytic system and operating at a temperature of between 350° C. and 850° C., and preferably between 550° C. and 750° C., at a pressure of between 0.5 and 50 atm, and preferably between 1 and 40 atm. If methane is used, the required volumetric $CO_2/CH_4$ reactant ratio is between 0.5 and 15, and preferably between 0.8 and 10.

Under all these thermodynamic conditions the process can also be conducted in the presence of steam, if the particular application of the product synthesis gas requires it. In this respect, it is necessary only to adjust the relative $CO_2$ and $H_2O$ feed quantities to obtain a synthesis gas with any desired $H_2/CO$ ratio from 1 to 6.

Although the process is particularly suitable for methane reforming reactions, any other light hydrocarbon or mixture can be used in the process. For example $C_1$-$C_4$ paraffins and olefins can be used by suitably choosing optimum temperature and pressure conditions and $CO_2$ ratios. Any natural gas containing hydrocarbon mixtures in which the methane content preferably exceeds 80% by volume can be used. Some examples are given below to better illustrate the invention, which however is not to be considered limited by them or to them.

EXAMPLE 1

Catalyst preparation

The inorganic oxide used as the support was prepared by the following procedure.

Figure 1:
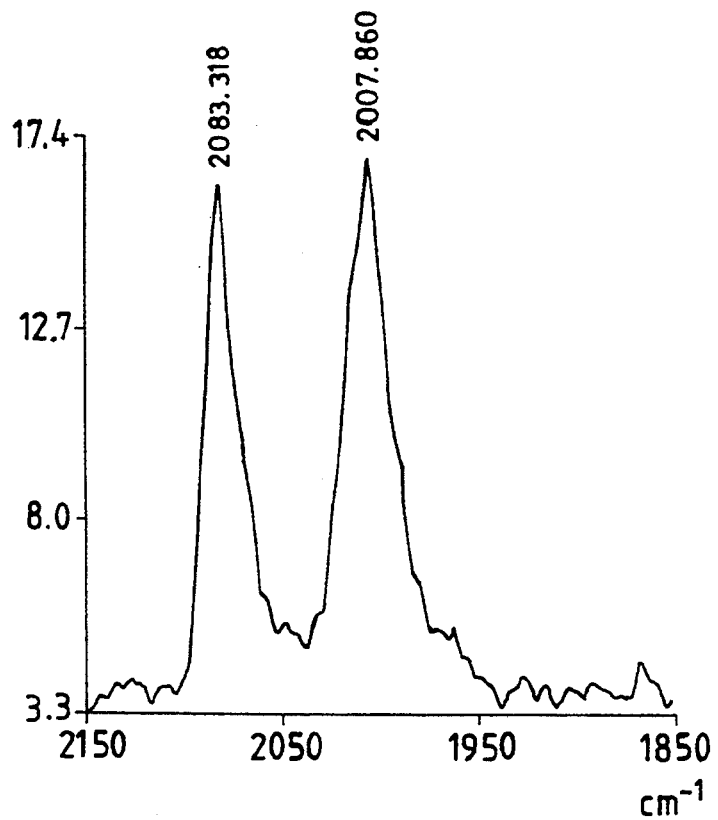
FIG. 1 shows the diffuse reflection spectrum of the catalyst of Example 1.

A commercial magnesium oxide (supplied by Carlo Erba) with a surface area of 210 m²/g was suspended under stirring in a tetraethylsilicate (TES) solution. The temperature was maintained between 80° C. and 90° C. to favour evaporation of the ethanol formed by the condensation reactions. A dry gaseous nitrogen stream was fed into the reaction environment. Gas chromatograph analysis of the exit gas showed the formation of ethanol. The condensation reaction was considered at an end when ethanol was no longer detected in the exit gas stream. At this point the temperature was raised to 180° C. to distil off the unreacted TES. The unreacted ethoxy groups bonded to silicon atoms anchored to the solid inorganic support were then hydrolyzed by feeding a stream of nitrogen and steam at 200° C. Ethanol was also detected in the gas stream during this step. Infrared spectrum analysis on the material obtained up to this point shows the presence of numerous hydroxyl bands which were not present in the starting material. The solid was then heated to 850° C. (5° C./min) and maintained at this temperature for 10 hours. After this treatment the surface area had reduced to 32 m²/g, the silicon content being 1.5% by weight. Differential thermal, thermogravimetric and infrared spectroscopic analysis conducted during three cycles at temperatures between 25° C. and 750° C. showed no significant alteration in the physico-chemical properties of the silicated materials obtained. 50 g of silicated magnesium oxide were then suspended in 100 ml of 2-methylpentane in a nitrogen atmosphere. A second solution of 50 ml of the same solvent containing 0.91 g of $Rh_4(CO)_{12}$ in a CO atmosphere was dripped rapidly into the silicated oxide suspension under stirring. The organic solution decolours rapidly passing from intense red to colourless, with the white solid simultaneously colouring. It is filtered in an inert atmosphere to obtain a material containing 1% by weight of Rh in a highly dispersed condition, as could be deduced from an analysis of the vibrational carbonyl bands of the surface complexes (see FIG. 1 showing the diffused reflectance spectrum obtained on the pulverulent solid, in which the horizontal axis represents the wave number in $cm^{-1}$ and the vertical axis represents Kubelka Munk intensity units). The transformations of the surface complexes during thermal reduction with hydrogen in gaseous $CH_4$ and $CO_2$ atmospheres were also studied by infrared spectroscopy. This resulted in a satisfactory understanding of surface nucleation phenomena, ensuring high reproducibility in material preparation.

Reforming reaction

Figure 2:
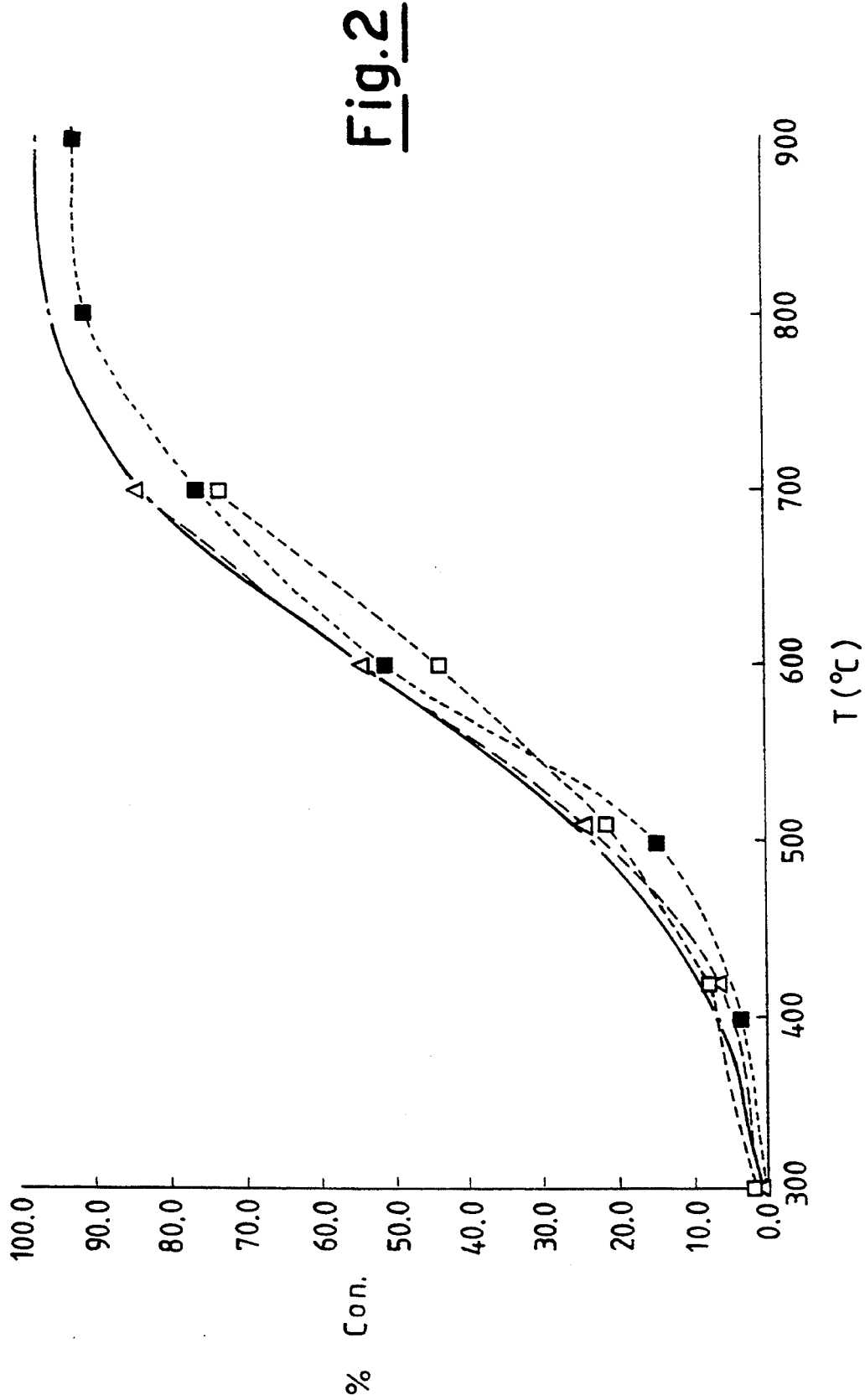
FIG. 2 shows $CH_4$ and $CO_2$ conversion values for various temperatures.

The reforming reaction was conducted in a fixed bed quartz reactor containing 3 cc of catalyst by feeding a gaseous equimolecular stream of $CH_4$ and $CO_2$ at a pressure of one atmosphere. In-line gas chromatograph analysis was carried out on the exit gas stream starting from 300° C. and continuing until 750° C. The gas hourly space velocity was maintained at 1000 (l/kg.h). FIG. 2 shows the various experimental $CH_4$ and $CO_2$ conversion values at the various temperatures investigated (shown by black squares and dots respectively). The same figure also shows the theoretically calculated conversion values for the equilibrium system for the reactions:

$$CO_2 + CH_4 \rightleftharpoons 2CO + 2H_2 \quad \text{(A)}$$

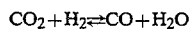

$$CO_2 + H_2 \rightleftharpoons CO + H_2O$$

Figure 3:
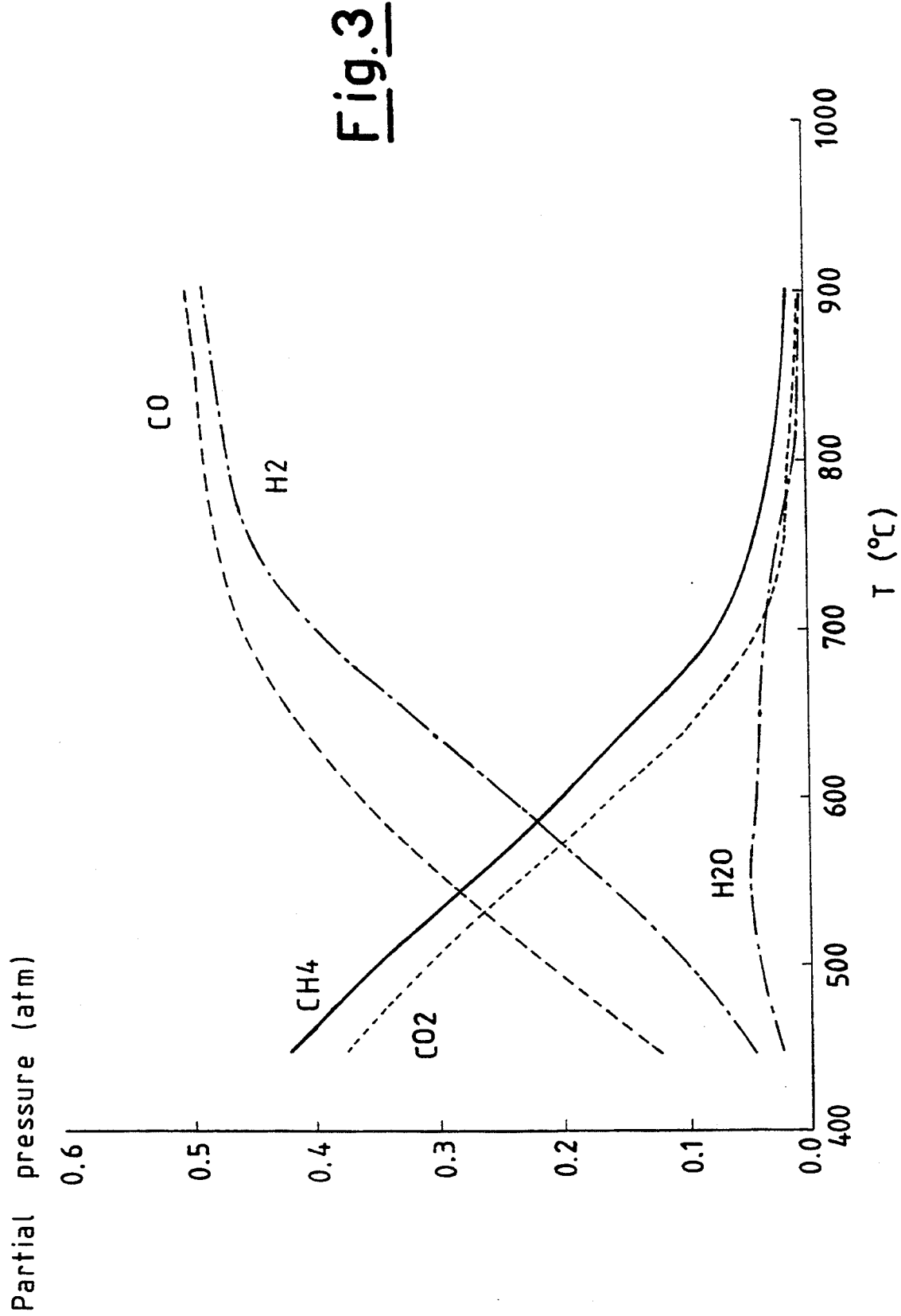
FIG. 3 shows theoretically calculated variations in the concentration of gaseous species versus temperature. More particularly, the catalytic system in question can be prepared by heterogeneous solid-liquid reaction at a temperature of between 0° C. and 150° C., and preferably between 20° C. and 50° C., between compounds of the metals of the platinum group dissolved in an organic solvent and the stated inorganic compounds dispersed in the same solvent. Following this procedure, the metal quantity which fixes to the substrate is determined mainly by the chemical properties of the inorganic oxide rather than by its porosity and surface area. These latter are however important with respect to the integrity and stability of the catalyst during the reforming reaction. In this respect, the accumulation of carbon in too small pores leads to material fragmentation. A reduced support surface area also results in a lesser dispersion of metal and favours sinter phenomena with consequent catalyst deactivation. The method for preparing supports consisting of silicated aluminium, magnesium, cerium or lanthanum oxides consists essentially of a condensation reaction between the inorganic oxide (of aluminium, magnesium, cerium or lanthanum) and a silicon compound containing hydrolyzable organic groups, followed by removal of the unhydrolyzed organic residues by combustion or reaction in the presence of steam. Using such silication methods, materials can be obtained containing percentages of silicon varying between 0.5 and 15% and preferably between 1 and 5% by weight. The present invention also provides a catalytic reforming process for light hydrocarbons, preferably methane, which enables mixtures of $H_2$ and CO to be obtained in molecular/ratios varying between 0.6 and 6, and preferably between 0.8 and 3.

The theoretical conversion of $CO_2$ at equilibrium is shown by triangles, and that of $CH_4$ by white squares. From the results obtained it can be deduced that the catalyst is extremely active and enables conversions close to the thermodynamic equilibrium conversions to be obtained within the temperature range studied. The $H_2O$ percentage in the reaction product mixture is also close to the values calculated for the system (A) at equilibrium. FIG. 3 shows the theoretically calculated variations in the concentrations of the gaseous species with temperature for the system under examination at a total pressure of 1 atm. The experimentally obtained gaseous species concentrations faithfully reproduce this pattern. The $H_2/CO$ ratio within the range of 650°–750° C. was slightly less than 1. Table 1 shows the results obtained for catalytic tests lasting 100 hours at 700° C. conducted with the catalysts described in Examples 1-4 and 6, compared with the results obtained using a commercial steam reforming catalyst (Example 7) containing approximately 15.5% of Ni supported on α-alumina.

During the tests, catalysts comprising Rh deposited on silicated magnesium oxide proved to be extremely active in catalyzing the reactions of the system (A) but, surprisingly, not in catalyzing the carbon formation reactions even where these are favoured under these conditions.

The results of quantitative carbon analysis on the discharged catalysts are shown in Table 1. During the 100 hours the activity and selectivity of the catalytic system remained constant.

EXAMPLE 2

The catalyst synthesis procedure described in Example 1 was repeated but using a solution containing 1.05 g of $Ru_3(CO)_{12}$ to obtain a solid containing 1% of Ru by weight. The reforming reaction was conducted as in Example 1 feeding the same reactant mixture under the same pressure and spatial velocity conditions at temperatures of between 300° C. and 750° C. Again in this case the $CH_4$ and $CO_2$ conversions are close to equilibrium values even if slightly less than those obtained in Example 1 (see Table 1).

EXAMPLES 3-4

In these cases the catalysts used contained the noble metals Rh (Example 3) or Ru (Example 4) and silicated alumina. This latter was prepared by condensing tetraethylsilicate with a gamma alumina supplied by AKZO in accordance with the procedure described in Example 1. The catalytic systems thus obtained proved to possess the same characteristics as those described in Examples 1 and 2, i.e. active in catalyzing the reactions of the system (A) within the entire temperature range investigated but inactive in catalyzing the reactions involved in the formation of carbon on the catalyst. Table 1 also shows the results obtained during 100 hour catalytic tests in these two cases.

EXAMPLE 5

In this case the reactants were a gaseous stream of $C_2H_6$ and $CO_2$ in a ½ ratio. The catalytic tests were conducted at temperatures between 400° C. and 700° C. using the catalyst of Example 2. The ethane conversion at 700° C. during a catalytic test lasting 100 hours was found to be 100% and the $CO_2$ conversion 98%. The $H_2/CO$ ratio was 0.7. The methane in the exit gas was less than 3%.

EXAMPLE 6

In this example the catalyst synthesis procedure described in Example 1 was modified in that the noble metal was deposited on the silicated oxide by an impregnation reaction conducted by dripping an aqueous solution of Rh nitrate onto the silicated oxide until it was just soaked. The catalyst obtained in this manner contained 1% (wt/wt) of Rh. In this case the catalytic tests conducted as in Examples 1-5 showed that the material modifies its characteristics during the first 10 hours of reaction at 700° C. During this period the conversion values increase until they settle down at the values shown in Table 1.

However after the induction period the characteristics of the catalytic systems described in Examples 1-4 are again obtained in this case.

EXAMPLE 7—Comparative

Compared with Example 1 a commercial steam reforming catalyst consisting of about 15.5% by weight of Ni supported on alumina was used.

The results obtained are shown in Table 1.

TABLE 1

| | % conv $CO_2$ | % conv $CH_4$ | sel. * | $H_2/CO$ (mol/mol) | mg C/g cat (100 h) |
|---|---|---|---|---|---|
| Ex. 1 | 84.1 | 73.4 | 96.2 | 0.87 | <0.5 |
| Ex. 2 | 75.6 | 68.3 | 97.1 | 0.90 | 0.5 |
| Ex. 3 | 81.4 | 70.1 | 96.0 | 0.85 | <0.5 |
| Ex. 4 | 71.5 | 63.7 | 96.7 | 0.88 | 0.8 |
| Ex. 6 | 81.2 | 70.8 | 96.0 | 0.85 | 0.7 |
| Ex. 7 | 68.5 | 64.3 | 85.2 | 0.92 | 65.2 |

*(moles CO + $H_2$)/(moles CO + $H_2$ + $H_2O$ + C).100

We claim:

1. A catalytic system for the production of synthesis gas by reforming light hydrocarbons with $CO_2$, characterized by being formed from:
   one or more compounds of metals of the platinum group;
   a support consisting of silicated aluminum, magnesium, cerium or lanthanum oxides; in which the weight percentage of the metal or metals of the platinum group in the catalytic system is between 0.01 and 20%,
   said support being prepared by a process consisting essentially of the condensation of an aluminum, magnesium, cerium or lanthanum oxide with a silicon compound containing hydrolyzable organic groups, and the subsequent removal of the non-hydrolyzed organic residues by combustion in the presence of water vapor,
   said catalytic system being obtained either
   1) by impregnating the silicated oxides with a solution of a salt of the metals of the platinum group, followed by thermal drying and calcination, or
   2) by dispersing the silicated oxides in an organic solvent and then reacting them, in a carbon monoxide atmosphere or in an inert atmosphere, with solutions of said one or more compounds of metals of the platinum group.

2. A catalytic system as claimed in claim 1, wherein the weight percentage of the metal or metals of the platinum group is between 0.1 and 5%.

3. A catalytic system as claimed in claim 1, wherein the metals of the platinum group are chosen from rhodium, ruthenium and iridium.

4. A catalytic system as claimed in claim 1, wherein the surface area varies from 1 to 400 m²/g and the pore volume from 0.1 to 3 cc/g.

5. A catalytic system as claimed in claim 4, wherein the surface area varies from 10 to 200 m²/g.

6. A catalytic system for the production of synthesis gas by reforming light hydrocarbons with $CO_2$, characterized by being formed from:
   one or more compounds of metals of the platinum group;
   a support consisting of silicated aluminum, magnesium, cerium, or lanthanum oxides; in which the weight percentage of the metal or metals of the platinum group in the catalytic system is between 0.01 and 20%;
   said catalyst system formed by heterogeneous solid-liquid reaction of one or more compounds of the metals of the platinum group dissolved in an organic solvent and the silicated inorganic compounds slurried in the same solvent at a temperature between 0° C. and 150° C.

7. The catalyst system of claim 6 wherein reaction occurs at a temperature between 20° C. and 50° C.

8. A process for preparing a catalytic system for the production of synthesis gas by reforming light hydrocarbons with $CO_2$, characterized by being formed from:
- one or more compounds of metals of the platinum group;
- a support consisting of silicated aluminum, magnesium, cerium, or lanthanum oxides; in which the weight percentage of the metal or metals of the platinum group in the catalytic system is between 0.01 and 20%;
- said process comprising the steps of reacting, in a CO atmosphere or an inert gas atmosphere, by a solid-liquid heterogeneous reaction at a temperature of between 0° C. to 150° C., one or more compounds of the metals of the platinum group dissolved in an organic solvent with the silicated inorganic compounds slurried in the same solvent, the silicated inorganic compounds being obtained by condensation of an inorganic oxide of Al, Mg, Ce, or La with a silicon compound which contains hydrolyzable organic groups, followed by a combustion reaction or a reaction in the presence of water vapor.

9. A process according to claim 8 wherein the reaction occurs at a temperature between 20° C. and 50° C.

10. A catalytic system as claimed in claim 1, wherein said support consists of silicated aluminum, cerium or lanthanum oxides.

11. A catalytic system as claimed in claim 1, wherein said catalytic system is obtained by impregnating the silicated oxides with a solution of a salt of the metals of the platinum group, followed by thermal drying and calcination.

12. A catalytic system as claimed in claim 1, wherein said catalytic system is obtained by dispersing the silicated oxides in an organic solvent and then reacting them, in a carbon monoxide atmosphere or in an inert atmosphere, with solutions of said one or more compounds of metals of the platinum group.

* * * * *

UNITED STATES PATENT AND TRADEMARK OFFICE
CERTIFICATE OF CORRECTION

PATENT NO.    : 5,336,655
DATED         : August 9, 1994
INVENTOR(S)   : Luca BASINI, et al.

It is certified that error appears in the above-indentified patent and that said Letters Patent is hereby corrected as shown below:

On the title page, Item [75], the third inventor's name should read:

--Stefano Rossini--

Signed and Sealed this

Sixth Day of December, 1994

Attest:

BRUCE LEHMAN

Attesting Officer    Commissioner of Patents and Trademarks